United States Patent [19]

Kioka et al.

[11] Patent Number: 4,673,719

[45] Date of Patent: Jun. 16, 1987

[54] PROCESS FOR PRODUCING OLEFIN POLYMERS AND CATALYST COMPOSITION THEREFOR

[75] Inventors: Mamoru Kioka, Ohtake; Norio Kashiwa, Iwakuni, both of Japan

[73] Assignee: Mitsui Petrochemical Industries, Ltd., Tokyo, Japan

[21] Appl. No.: 563,320

[22] Filed: Dec. 20, 1983

[30] Foreign Application Priority Data

Dec. 24, 1982 [JP] Japan .................. 57-225998

[51] Int. Cl.$^4$ .................. C08F 4/64; C08F 10/02
[52] U.S. Cl. .................. 526/125; 502/125; 502/126; 502/132; 526/124; 526/142; 526/352
[58] Field of Search .................. 526/125, 124, 142; 502/126, 125

[56] References Cited

U.S. PATENT DOCUMENTS

| | | | |
|---|---|---|---|
| 3,219,652 | 11/1965 | Hill et al. .................. | 526/142 |
| 3,917,575 | 11/1975 | Matsuma et al. .................. | 526/151 |
| 4,028,481 | 6/1977 | Shiomura et al. .................. | 526/142 |
| 4,180,636 | 12/1979 | Hirota et al. .................. | 526/125 |
| 4,328,328 | 5/1982 | Minami et al. .................. | 526/125 |
| 4,330,649 | 5/1982 | Kioka et al. .................. | 526/125 |
| 4,370,455 | 1/1983 | Ueda et al. .................. | 526/125 |
| 4,394,291 | 7/1983 | Hawley .................. | 526/125 |
| 4,442,276 | 4/1984 | Kashiwa et al. .................. | 526/125 |

*Primary Examiner*—Edward J. Smith
*Attorney, Agent, or Firm*—Sherman and Shalloway

[57] ABSTRACT

In a process for producing olefin polymers or copolymers which comprises polymerizing olefins or copolymerizing olefins with each other or with dienes in the presence of [A] a solid titanium catalyst component containing magnesium, titanium and halogen as essential ingredients and [B] an organometallic compound of a metal selected from the group consisting of metals of Groups I to III of the periodic table; the improvement wherein said catalyst component [A] is obtained by contacting (i) a magnesium compound in the liquid state with (ii) a titanium compound in the liquid state to form a solid product or first preparing a liquid mixture of the magnesium compound (i) and the titanium compound (ii) and then forming a solid product therefrom, said reaction of forming the solid product being carried out in the presence of at least one electron donor (iii) selected from the group consisting of aliphatic carboxylic acids with 1 to 6 carbon atoms, aryloxy group-containing alcohols, alkylene glycol diethers, aluminum trialkoxides and aluminum triaryloxides, said solid product being not contacted, during or after its formation, with an ester selected from the group consisting of esters of polycarboxylic acids and esters of polyhydroxy compounds.

10 Claims, No Drawings

4,673,719

PROCESS FOR PRODUCING OLEFIN POLYMERS AND CATALYST COMPOSITION THEREFOR

This invention relates to a process for procuding olefin polymers (sometimes used to denote both homopolymers and copolymers of olefins) by the polymerization (sometimes used to denote both homopolymerization and copolymerization) of olefins. Particularly, this invention relates to a process for producing olefin polymers which when applied to slurry polymerization or vapor-phase polymerization of olefins, for example, enables the polymerization operation and the aftertreating operation to be carried out smoothly and efficiently, and can give with a high catalytic efficiency olefin polymers having a desirable size and shape and a narrow particle size distribution with a reduced amount of a fine powdery polymer. This invention also relates to a new type of a solid titanium catalyst component for use in the above improved process.

More specifically, this invention relates to a process for producing olefin polymers or copolymers which comprises polymerizing olefins or copolymerizing olefins with each other or with dienes in the presence of [A] a solid titanium catalyst component containing magnesium, titanium and halogen as essential ingredient and [B] an organometallic compound of a metal selected from the group consisting of metals of Groups I to III of the periodic table; characterized in that said catalyst component [A] is obtained by contacting (i) a magnesium compound in the liquid state with (ii) a titanium compound in the liquid state to form a solid product or first preparing a liquid mixture of the magnesium compound (i) and the titanium compound (ii) and then forming a solid product therefrom, said reaction of forming the solid product being carried out in the presence of at least one electron donor (iii) selected from the group consisting of aliphatic carboxylic acids with 1 to 6 carbon atoms, aryloxy group-containing alcohols, alkylene glycol diethers, aluminum trialkoxides and aluminum triaryloxides, said solid product being not contacted, during or after its formation, with an ester selected from the group consisting of esters of polycarboxylic acids and esters of polyhydroxy compounds.

Many proposals have already been made on methods of producing a solid catalyst component containing magnesium, titanium and halogen as essential ingredients which is useful as a titanium catalyst component for polymerization of olefins. It is also known that or catalyst formed from this solid catalyst component and an organometallic compound of a metal of Groups I to III of the periodic table is suitable for polymerizing olefins with high activity. Many of these proposals, however, are still desired to be improved in regard to polymerization activity or the properties of the resulting powdery polymer.

For example, to obtain an olefin polymer of high quality which does not require a catalyst removing operation after polymerization, it is desired that the yield of the polymer per unit amount of titanium or halogen should be sufficiently high.

Furthermore, in slurry polymerization or vapor-phase polymerization, the polymer should desirably has an excellent particle size distribution, excellent flowability, a high bulk density and good breakage resistance.

Furthermore in order that the polymer in its powder form as produced may be acceptable to the market without performing pelletization which is usually carried out, it is desired that the polymer should have a small proportion of a fine powder and consist of particles having a large particle diameter with a uniform shape or particle size distribution.

No process for producing olefin polymers has yet been provided which can fully meet the various requirements.

The present inventors have long been engaged in a research and development work on a process for producing olefin polymers which can meet the aforesaid requirements. Previously, they proposed the following process in Japanese Laid-Open Patent Publication No. 83006/1983 laid-open on May 18, 1983 (corresponding to West German OLS No. 3,241,999; and U.S. patent application Ser. No. 428,140, filed Sept. 29, 1982, now abandoned).

A process for producing olefin polymers or copolymers which comprises polymerizing olefins or copolymerizing olefins with each other or with dienes, preferably, polymerizing or copolymerizing alpha-olefins having at least 3 carbon atoms or copolymerizing at least one such olefin with up to 10 mole% of ethylene and/or diene in the presence of a catalyst system composed of the following components (A), (B) and (C):

(A) a solid titanium catalyst component containing magnesium, titanium, halogen and an ester selected from the group consisting of esters of polycarboxylic acids and esters of polyhydroxy compounds, said catalyst component being obtained by contacting a liquid hydrocarbon solution of (i) a magnesium compound with (ii) a titanium compound in the liquid state to form a solid product or first preparing a liquid hydrocarbon solution of the magnesium compound (i) and the titanium compound (ii) and then forming a solid product therefrom, said reaction of forming the solid product being carried out in the presence of (D) at least one electron donor selected from the group consisting of monocarboxylic acid esters, aliphatic carboxylic acids, carboxylic acid anhydrides, ketones, aliphatic ethers, aliphatic carbonates, alkoxy group-containing alcohols, aryloxy group-containing alcohols, organic silicon compounds having an Si—O—C bond and organic phosphorus compounds having a P—O—C bond, and during or after the formation of the solid product, contacting the solid product with (E) an ester selected from the group consisting of esters of polycarboxylic acids and esters of polyhydroxy compounds, (B) an organometallic compound of a metal selected from the group consisting of metals of Groups I to III of the periodic table, and (C) an organic silicon compound having an Si—O—C bond or Si—N—C bond.

On further investigations, the present inventors have found that a process for producing olefin polymers which can meet the aforesaid requirements can be provided which comprises polymerizing or copolymerizing olefins, preferably polymerizing ethylene or copolymerizing ethylene with a minor amount (for example, not more than 10 mole %) of an alpha-olefin having at least 3 carbon atoms and/or a diene in the presence of a catalyst composed of [A] a solid titanium catalyst component and [B] an organometallic compound specified as above in the process of this invention by completely omitting the treatment of supporting the ester (E) which is essential in the process of the above Japanese Laid-Open Patent Publication No. 83006/1983 and without the need for the organic silicon compound (C)

which is essential in the process of the above Japanese patent document. It has thus been found that when the process is applied to slurry polymerization or vapor-phase polymerization of olefins for example, the process enables the polymerization operation and the after-treating operation to be carried out smoothly and efficiently, and can give with a high catalytic efficiency olefin polymers having a desirable size and shape and a narrow particle size distribution with a reduced amount of a fine powdery polymer.

It is an object of this invention therefore to provide an improved process for producing olefin polymers.

Another object of this invention is to provide a new polymerization catalyst, particularly a titanium catalyst component, suitable for practicing the improved process of the invention.

The above and other objects and advantages will become more apparent from the following description.

The solid titanium catalyst component [A] in the present invention can be obtained by contacting (i) a magnesium compound in the liquid state with (ii) a titanium compound in the liquid state to form a solid product or first preparing a liquid mixture of the magnesium compound (i) and the titanium compound (ii) and then forming a solid product therefrom. The reaction of forming the solid product is carried out in the presence of at least one electron donor (iii) selected from the group consisting of aliphatic carboxylic acids having 1 to 6 carbon atoms, aryloxy group-containing alcohols, alkylene glycol diethers, aluminum trialkoxides and aluminium triaryloxides. The solid product is not contacted, during or after its formation, with an ester selected from the group consisting of esters of polycarboxylic acids and esters of polyhydroxy compounds.

The magnesium compound (i) used in the preparation of the solid titanium catalyst component (A) in this invention is preferably a magnesium compound having no reducing ability, i.e. a magnesium compound free from a magnesium-carbon bond or magnesium-hydrogen bond. Such a magnesium compound may be derived from a magnesium compound having reducing ability.

Illustrative of the magnesium compound having no reducing ability are magnesium halides such as magnesium chloride, magnesium bromide, magnesium iodide and magnesium fluoride; alkoxy magnesium halides, for example $C_1$-$C_{10}$ alkoxy magnesium halides such as methoxy magnesium chloride, ethoxy magnesium chloride, isopropoxy magnesium chloride, butoxy magnesium chloride and octoxy magnesium chloride; aryloxy magnesium halides, for example phenoxy magnesium halides which may optionally be substituted by lower alkyl groups, such as phenoxy magnesium chloride and methylphenoxy magnesium chloride; alkoxy magnesiums, for example $C_1$-$C_{10}$ alkoxy magnesiums such as ethoxy magnesium, isopropoxy magnesium, butoxy magnesium, n-octoxy magnesium and 2-ethylhexoxy magnesium; aryloxy magnesiums, for example phenoxy magnesiums which may optionally be substituted by lower alkyl groups such as phenoxy magnesium and dimethylphenoxy magnesium; and magnesium salts of carboxylic acids, for example magnesium salts of aliphatic carboxylic acids having 1 to 20 carbon atoms, such as magnesium laurate and magnesium stearate.

The magnesium compounds may be in the form of complexes or mixtures with other metals. The halogen-containing magnesium compounds, above all magnesium chloride, alkoxy magnesium chlorides and aryloxy magnesium chlorides, are preferred among these magnesium compounds.

The magnesium compounds (i) may be in the form of a solution of such an exemplified magnesium compound in a solvent.

In preparing the magnesium compound (i) in the liquid state, various solvents can be used. Examples include aliphatic hydrocarbons such as pentane, hexane, heptane, octane, decane, dodecane, tetradecane and kerosene; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The solution may be prepared by various methods chosen depending upon the types of the magnesium compound and the solvent, for example by simply mixing the two; mixing the two and heating the mixture; or mixing the magnesium compound with the above solvent in the presence of, or after being treated with, an electron donor capable of solubilizing the magnesium compound, such as an alcohol, an aldehyde, a carboxylic acid, an amine, an ether or a mixture thereof, or a mixture thereof with another electron donor, and as required, heating the mixture.

For example, in the case of dissolving a halogen-containing magnesium compound (i) in the hydrocarbon solvent with the aid of an alcohol, the alcohol may be used in an amount of at least about 1 mole, preferably at least about 1.5 mole, especially preferably more than 2 moles, per mole of the halogen-containing magnesium compound although the molar ratio of these may be varied properly depending upon the type and amount of the hydrocarbon solvent and the type of the magnesium compound. There is no particular upper limit to the amount of the alcohol, but economically, it is desirable not to use it in too large an amount. For example, the amount of the alcohol is up to about 40 moles, preferably up to about 20 moles, especially preferably up to about 10 moles, per mole of the magnesium compound (i).

When an aliphatic or alicyclic hydrocarbon is used as the solvent, alcohols are used in the above-mentioned proportion, and among them, alcohols having at least 6 carbon atoms are used in an amount of at least about 1 mole, preferably at least about 1.5 moles, per mole of the halogen-containing magnesium compound. This is preferred since the halogen-containing magnesium compound can be solubilized with the use of alcohols in a small total amount and a catalyst component having high activity can be prepared. If in this case only alcohols having not more than 5 carbon atoms are used, their amount should be at least about 15 moles per mole of the halogen-containing magnesium compound, and the resulting catalyst component has lower catalytic activity than that obtained as described above. On the other hand, when an aromatic hydrocarbon is used as the solvent, the halogen-containing magnesium compound can be solubilized by using alcohols in the aforesaid amounts irrespective of the types of the alcohols. Furthermore, if, for example, a tetraalkoxy titanium is caused to be present together as the titanium compound (ii) in solubilizing the halogen-containing magnesium compound, the use of a small amount of alcohols makes it possible to solubilize the halogen-containing magnesium compound.

Preferably, the contacting of the halogen-containing magnesium compound with the alcohols is carried out in a hydrocarbon medium usually at room temperature or a higher temperature, and depending upon the types of these compounds, at more than about 65° C., preferably about 80° to about 300° C., more preferably at about 100° to about 200° C. The contact time can also be properly selected. For example, it is about 15 minutes to about 5 hours, preferably about 30 minutes to about 2 hours. Illustrative of suitable alcohols having at least 6 carbon atoms are $C_6$–$C_{20}$ aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol; $C_6$–$C_{20}$ alicyclic alcohols such as cyclohexanol and methylcyclohexanol; $C_7$–$C_{20}$ aromatic alcohols such as benzyl alcohol, methylbenzyl alcohol, isopropylbenzyl alcohol, alpha-methylbenzyl alcohol and alpha,alpha-dimethylbenzyl alcohol; and $C_6$–$C_{20}$ aliphatic alcohols containing an alkoxy group, such as n-butyl Cellosolve (=ethylene glycol mono-n-butyl ether) and 1-butoxy-2-propanol. Examples of other alcohols are alcohols having not more than 5 carbon atoms such as methanol, ethanol, propanol, butanol, ethylene glycol and methyl carbitol.

When the magnesium compound (i) is to be dissolved in the hydrocarbon solvent by using a carboxylic acid, organic carboxylic acids having at least 7 carbon atoms are preferred. Examples include organic carboxylic acids having 7 to 20 carbon atoms, such as caprylic acid, 2-ethylhexanoic acid, undecylenic acid, undecanoic acid, nonylic acid and octanoic acid.

When the magnesium compound (i) is to be dissolved in the hydrocarbon solvent by using an aldehyde, aldehydes having at least 7 carbon atoms are preferred. Examples are aldehydes having 7 to 18 carbon atoms, such as capric aldehyde, 2-ethylhexyl aldehyde, capryl aldehyde and undecylic aldehyde.

Suitable amines are those having at least 6 carbon atoms. Examples include amines having 6 to 18 carbon atoms, such as heptylamine, octylamine, nonylamine, decylamine, laurylamine, undecylamine and 2-ethylhexylamine.

Illustrative of the ether is tetrahydrofuran.

The preferred amounts of these carboxylic acids, aldehydes, amines and ethers and the preferred temperatures at which they are used are much the same as described hereinabove.

The solution of the magnesium compound (i) may also be formed by using magnesium metal or another magnesium compound capable of being converted to the magnesium compound (i), and dissolving it in the solvent while converting it to the magnesium compound (i). For example, this can be achieved by dissolving or suspending a magnesium compound having an alkyl, alkoxy, aryloxy, acyl, amino or hydroxyl group, magnesium oxide, or metallic magnesium in a solvent having the alcohol, amine, aldehyde, carboxylic acid, ether, etc. dissolved therein, and forming a halogen-containing magnesium compound (i) having no reducing ability while halogenating it with a halogenating agent (which, however, is not always necessary when a halogenated hydrocarbon is used as the solvent) such as a hydrogen halide, a halogenated hydrocarbon, a halogen-containing silicon compound, halogen, a halogen-containing aluminum compound, a halogen-containing lithium compound or a halogen-containing sulfur compound. Alternatively, it is possible to treat a Grignard reagent, a dialkyl magnesium, magnesium hydride or a complex of such a magnesium compound with another organometalic compound, for example a magnesium compound having reducing ability represented by the formula $M_\alpha Mg_\beta R^1_p R^2_q X_r Y_s$ wherein M represents aluminum, zinc, boron or beryllium, $R^1$ and $R^2$ represents a hydrocarbon group, X and Y represent a group of the formula $OR^3$, $OSiR^4R^5R^6$, $NR^7R^8$ or $SR^9$, $R^3$, $R^4$, $R^5$, $R^6$, $R^7$ and $R^8$ represent a hydrogen atom or a hydrocarbon group, $R^9$ represents a hydrocarbon group, $\alpha$ and $\beta$ are greater than zero, p, q, r and s are a number of at least 0, m represents the atomic valence of M, $\beta/\alpha \geq 0.5$, $p+q+r+s=m\alpha+2\beta$, and $0 \leq (r+s)/(\alpha+\beta) < 1.0$ with a compound capable of destroying reducing ability, such as an alcohol, a ketone, an ester, an ether, an acid halide, a silanol, a siloxane, oxygen, water, an acetal, or an alkoxy or aryloxy compound of silicon or aluminum, and dissolving the resulting magnesium compound (i) having no reducing ability in the solvent. In the above formula, examples of the hydrocarbon groups are $C_1$ to $C_{20}$ alkyl groups such as an ethyl group, propyl group, butyl group, amyl group, hexyl group, octyl group and dodecyl group, and $C_6$ to $C_{20}$ aryl groups such as a phenyl group and tolyl group.

Various titanium compounds can be used as the titanium compound (ii) in the preparation of the solid titanium catalyst component [A]. Preferred are tetravalent titanium compounds of the formula

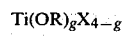

$$Ti(OR)_g X_{4-g}$$

wherein R represents a hydrocarbon group, X represents a halogen atom and g is a number represented by $0 \leq g \leq 4$. In the above formula, examples of the hydrocarbon group are $C_1$-$C_{10}$ alkyl groups, and a phenyl group which may have a substituent such as a lower alkyl group, for example $C_1$ to $C_4$ alkyl group, and a halogen atom.

Specific examples of the titanium compound (ii) include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(On\text{—}C_4H_9)Cl_3$, $Ti(OC_2H_5)Br_3$ and $Ti(Oiso\text{—}C_4H_9)Br_3$; alkoxy titanium dihalides such as $Ti(OCH_3)_2Cl_2$, $Ti(OC_2H_5)_2Cl_2$, $Ti(On\text{—}C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(On\text{—}C_4H_9)_3Cl$ and $Ti(OC_2H_5)_3Br$; tetraalkoxy titaniums such as $Ti(OCH_3)_4$, $Ti(OC_2H_5)_4$ and $Ti(On\text{—}C_4H_9)_4$; aryloxy titanium halides such as $Ti(OC_6H_6)Cl_3$; aryloxy titanium such as $Ti(OC_6H_6)_4$; mixtures of these; and mixtures of these with hydrogen halides, halogens, other metallic compounds such as aluminum compounds or silicon compounds, or sulfur compounds. Of these, halogen-containing titanium compounds are preferred. Titanium tetrahalides, above all titanium tetrachloride, are especially preferred.

The titanium compound (ii) in the liquid state may be one, or a mixture, of titanium compounds which are liquid themselves, or may be a solution of the titanium compound in a solvent such as hydrocarbons.

In the present invention, the solid titanium catalyst component (A) containing magnesium, titanium and halogen, as essential components, can be prepared in the following manner.

A liquid solution of the magnesium compound (i) is contacted with the titanium compound (ii) in the liquid state to form a solid product [to be sometimes referred to as method (a) hereinafter]. Or a liquid solution of a mixture of the magnesium compound (i) and the titanium compound (ii) is first prepared, and then a solid product is formed from it [to be sometimes referred to as method (b) hereinafter].

The reaction of forming the solid product is carried out in the presence of at least one electron donor (iii) selected from the group consisting of aliphatic carboxylic acids with 1 to 6 carbon atoms, aryloxy group-containing alcohols, alkylene glycol diethers, aluminum trialkoxides and aluminum triaryloxides. Thus, there can be easily obtained a solid titanium catalyst component [A] which has excellent activity, an excellent particle shape, a large particle diameter and a narrow particle size distribution.

Specific examples of the aliphatic carboxylic acids with 1 to 6 carbon atoms are formic acid, acetic acid, propionic acid, butyric acid and valeric acid. Specific examples of the aryloxy group-containing alcohols are $C_6$-$C_{12}$ aryloxy-group containing alcohols such as ethylene glycol monophenyl ether and propylene glycol monophenyl ether. Specific examples of the alkylene glycol diethers include $C_1$-$C_6$ alkylene glycol diethers such as ethylene glycol dimethyl ether, ethylene glycol diethyl ether, ethylene glycol diisobutyl ether, ethylene glycol di-tert-butyl ether, ethylene glycol diphenyl ether, propylene glycol dibutyl ether and propylene glycol diethyl ether. Specific examples of aluminum trialkoxides include aluminum tri($C_1$-$C_{12}$) alkoxides such as aluminum trimethoxide, aluminum triethoxide, aluminum triisopropoxide, aluminum tri-tert-butoxide, aluminum tri-n-octoxide and aluminum tri-2-ethylhexoxide. Specific examples of the aluminum triaryloxides are tri($C_6$-$C_{12}$) aryloxides such as aluminum triphenoxide, aluminum trimethylphenoxide and aluminum tri(-dimethylphenoxide).

The preferred amount of the electron donor (iii) used varies depending upon its type or the conditions of forming the solid product [A] and can be properly selected. For example, it is about 0.01 to about 1 mole, preferably about 0.05 to about 0.5 mole, per mole of the magnesium compound (i). By adjusting the amount of the electron donor (iii), the particle diameter of the solid product [A] can be adjusted.

The liquid mixture in the method (b) can be prepared, for example, by dissolving a magnesium halide, an alkoxy magnesium halide, a dialkoxy magnesium, etc. in a tetraalkoxy titanium in the presence or absence of a suitable diluent, or by dissolving titanium tetrachloride and a magnesium halide in tetrahydrofuran.

In the technique of forming a solid product containing magnesium and titanium by contacting the magnesium compound (i) in the liquid state with the titanium compound (ii) in the liquid state in accordance with method (a), it is preferred, for example, to react a magnesium halide in the liquid state containing a solubilizing agent such as the aforesaid alcohol for solubilization of magnesium compounds with a liquid of a titanium compound such as a liquid titanium halide, or to react a magnesium compound in the liquid state having good solubility, such as an alkoxymagnesium compound, with a liquid of a titanium compound such as a titanium halide.

The amount of the titanium compound (ii) used varies depending upon its type, the contacting conditions or the amount of the electron donor used, etc. and can be properly chosen. Preferably, it is at least about 1 mole, for example about 2 to about 200 moles such as about 2 to about 100 moles, particularly about 3 to about 100 moles, per mole of the magnesium compound (i).

If the solid product is difficult to form by the mere contacting of the magnesium compound (i) in the liquid state with the titanium compound (ii) in the liquid state, or if the solid product is difficult to form by simply leaving the solution of the compounds (i) and (ii) to stand, an additional amount of the titanium compound (ii), preferably a halogen-containing titanium compound (ii), may be added, or another precipitating agent may be added, so as to form the solid product. Illustrative of such precipitating agent are halogenating agents such as halogens, halogenated hydrocarbons, halogen-containing silicon compounds, halogen-containing aluminum compounds, halogen-containing lithium compounds, halogen-containing sulfur compounds and halogen-containing antimony compounds. Specific examples are chlorine, bromine, hydrogen chloride, hydrochloric acid, phosphorus pentachloride, thionyl chloride, thionyl bromide, sulfuryl chloride, phosgene, and nitrosyl chloride.

The solid product differs in shape or size depending upon the conditions for its formation. In order to obtain a solid product having a uniform shape and a uniform particle size, it is preferred to avoid its rapid formation. For example, when the solid product is to be formed by mixing the compounds (i) and (ii) in the liquid state and reacting them with each other, it is advisable to mix them at a sufficiently low temperature which does not cause rapid formation of a solid product, and then to elevate the temperature gradually. According to this method, there can easily be obtained a granular or spherical solid product having a relatively large particle diameter and a narrow particle size distribution.

When slurry polymerization or vapor phase polymerization is carried out by using the granular or spherical solid catalyst component [A] having a good particle size distribution which can be obtained as above, the resulting polymer is granular or spherical and has a narrow particle size distribution, a high bulk density and good flowability. The term "granular", as used herein denotes particles which look like an assembly of fine powders when examined by an enlarged scale photograph. Particles ranging from those having many uneven parts to those close to a true sphere can be obtained as the granular product depending upon the method of preparing the solid catalyst component.

The contacting of the liquid hydrocarbon solution of the magnesium compound (i) in the liquid state with the titanium compound (ii) in the liquid state may be effected, for example, at a temperature of about $-70°$ C. to about $+200°$ C. The temperature of the two liquids to be contacted may be different from each other. Generally, it is frequently preferred to employ a contacting method not involving too high a temperature, in order to obtain a solid catalyst component having a desirable granular or spherical shape and high performance. For example, temperatures of about $-70°$ to about $+50°$ C. are preferred. If the contacting temperature is too low, precipitation of a solid product may sometimes be not observed. In such a case, it is desirable to elevate the temperature to about 50° to about 150° C. for example, or continue the contacting for a longer period of time until precipitation of the solid product occurs.

In the present invention, the formation of the solid product may be carried out in the presence of a porous inorganic and/or organic compound, whereby the solid product is deposited on the surface of such a porous compound. In employing this method, the porous compound may be preliminarily contacted with the magnesium compound in the liquid state, and then with the titanium compound in the liquid state while it contains the liquid magnesium compound. Illustrative of such a porous compound are silica, alumina, polyolefins and products obtained by treating these compounds with halogen-containing compounds.

The solid titanium catalyst component [A] used in this invention consists basically of the solid product obtained as above and contains magnesium, titanium and halogen as essential ingredients. It may be a product obtained by simply washing the aforesaid solid product with an inert solvent such as a hydrocarbon. Preferably, it may be a product obtained by washing the solid product at least once at a temperature of about 20° to about 150° C. with an excessive amount of a liquid titanium compound or a liquid halogenated hydrocarbon, more preferably with titanium tetrachloride, 1,2-dichloroethane, chlorobenzene, methyl chloride, or hexachloroethane.

The solid titanium catalyst component [A] used in this invention may be one obtained by the aforesaid embodiment (a) or (b), with or without further washing with a titanium compound, a hydrocarbon, etc.

Preferably, the solid titanium catalyst component [A] which can be obtained by any of the above-described embodiments is used for polymerization after it is well washed with a hydrocarbon. The resulting solid titanium catalyst component [A] preferably has such a composition that the magnesium/titanium atomic ratio is, for example, from about 2 to about 100, preferably from about 4 to about 50, more preferably from about 5 to about 30, the halogen/titanium atomic ratio is, for example, from about 4 to about 100, preferably from about 5 to about 90, more preferably from about 8 to about 50. As stated hereinabove, the shape of the catalyst component [A] is, in many cases, granualr or nearly spherical. Usually, it has a specific surface area of, for example, at least about 10 m$^2$/g, preferably about 100 to about 1000 m$^2$/g, and a particle diameter in the range of, for example, about 1 to about 100 microns. Its particle size distribution is narrow.

According to this invention, olefins are polymerized by using a catalyst system composed of the solid titanium catalyst component [A] prepared as above and the organometallic compound (B) of the metal of Groups I to III of the periodic table.

As examples of the organometallic compound (B), the following compounds may be cited.

(1) Organoaluminum compounds having at least one Al—C bond in the molecule, for example organoaluminum compounds of the general formula $$R^1{}_m Al(OR^2)_n H_p X_q$$

wherein $R^1$ and $R^2$ are identical or different and each represents a hydrocarbon group, for example a hydrocarbon group having 1 to 15 carbon atoms, preferably 1 to 4 carbon atoms, X represents a halogen atom, m is a number represented by $0 < m \leq 3$, n is a number represented by $0 \leq n < 3$, p is a number represented by $0 \leq p < 3$, q is a number represented by $0 \leq q < 3$, and $m+n+p+q=3$.

(2) Complex alkylated products of aluminum and a Group I metal represented by the general formula $$M^1 Al R^1{}_4$$

wherein $M^1$ represents Li, Na or K, and $R^1$ is as defined above.

(3) Dialkyl compounds of a Group II metal represented by the general formula $$R^1 R^2 M^2$$

wherein $R^1$ and $R^2$ are as defined above, and $M^2$ is Mg, Zn or Cd.

In the above formulae, examples of the hydrocarbon group for $R^1$ and $R^2$ are alkyl groups and aryl groups.

Examples of the organoaluminum compounds (1) are shown below.

Compounds of the general formula $R^1{}_m Al(OR^2)_{3-m}$ wherein $R^1$ and $R^2$ are as defined above, m is preferably a number represented by $1.5 \leq m \leq 3$;

compounds of the general formula $R^1{}_m AlX_{3-m}$ wherein $R^1$ is as defined above, X is halogen, and m is preferably a number represented by $0 < m < 3$;

compounds represented by the general formula $R^1{}_m AlH_{3-m}$ wherein $R^1$ is as defined above, and m is preferably a number represented by $2 \leq m < 3$, and compounds represented by the general formula $R^1{}_m Al(OR^2)_n X_q$ wherein $R^1$ and $R^2$ are as defined above, X represents halogen, $0 < m \leq 3$, $0 \leq n < 3$, $0 \leq q < 3$, and $m+n+q=3$.

Specific examples of the organoaluminum compounds of formula (1) are trialkyl aluminums such as triethyl aluminum and tributyl aluminum; trialkenyl aluminums such as triisoprenyl aluminum; partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R^1{}_{2.5} Al(OR^2)_{0.5}$; partially halogenated alkyl aluminums, for example, dialkyl aluminum halide such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; partially hydrogenated alkyl aluminums, for example, dialkyl aluminum hydroxides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

Examples of the compounds mentioned in (2) above are LiAl(C$_2$H$_5$)$_4$ and LiAl(C$_7$H$_{15}$)$_4$.

Examples of the compounds mentioned in (3) above are diethyl zinc and diethyl magnesium. Alkyl magnesium halides such as ethyl magnesium chloride may also be used.

Organoaluminum compounds in which two or more aluminum atoms are bonded through an oxygen or nitrogen atom, similar to the compounds (1), may also be used. Examples of such aluminum compounds are (C$_2$H$_5$)$_2$AlOAl(C$_2$H$_5$)$_2$, (C$_4$H$_9$)$_2$AlOAl(C$_4$H$_9$)$_2$ and

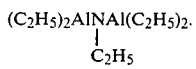

Among the above organoaluminum compounds, trialkyl aluminums and alkyl aluminums in which two or more aluminums are bonded are preferred.

According to this invention, there is provided a process for producing olefin polymers or copolymers which comprises polymerizing or copolymerizing olefins or copolymerizing at least one olefin with a minor amount, for example up to 10 mole%, of a diene in the presence of a catalyst system composed of the solid titanium catalyst component [A] and the organometallic compound [B].

Illustrative of olefins which can be used are olefins having 2 to 10 carbon atoms such as ethylene, propylene, 1-butene, 4-methyl-1-pentene and 1-octene. They may be homopolymerized or random-copolymerized or block-copolymerized. The diene may be a polyunsaturated compound such as conjugated dienes or nonconjugated dienes. Specific examples include butadiene, isoprene, 1,3-pentadiene, 1,4-pentadiene, 1,5-hexadiene, 1,4-hexadiene, ethylidene norbornene, vinyl nobornene and 1,7-octadiene.

The catalyst system of this invention can be advantageously used in the polymerization or copolymerization of ethylene, specifically in the polymerization of ethylene or copolymerization of ethylene with at least one alpha-olefin having at least 3 carbon atoms such as alpha-olefins having 3 to 10 carbon atoms and/or a diene. For example, copolymerization of ethylene with up to 10 mole% of at least one such alpha-olefin and/or a diene.

The polymerization can be carried out either in the liquid or vapor phase. When the liquid-phase polymerization is carried out, inert solvents such as hexane, heptane and kerosene may be used as a reaction medium. If desired, the olefin itself may be used as the reaction medium. The amount of the catalyst can be properly selected. For example, in a preferred embodiment, per liter of the reaction solvent in the case of the liquid-phase reaction or per liter of the volume of the reaction zone in the case of the vapor-phase reaction, the component [A] is used in an amount of 0.0001 to 1 millimole as the titanium atom; the component [B] is used in such a proportion that the amount of the metal atom in the component [B] is 1 to 2,000 moles, preferably 5 to 500 moles, per mole of the titanium atom in the component [A].

In performing the polymerization, hydrogen, a halogenated hydrocarbon, and an electron donor may be added to the polymerization system in order, for example, to increase the activity of the catalyst, and control the molecular weight, molecular weight distribution or composition distribution of the polymer.

The polymerization temperature is preferably about 20° to about 200° C., more preferably about 50° to about 180° C. The pressure is from atmospheric pressure to about 100 kg/cm², preferably from about 2 to about 50 kg/cm². The polymerization can be carried out batch-wise, semicontinuously, or continuously. Or the polymerization may also be carried out in two or more stages having different reaction conditions.

In the present invention, an olefin polymer can be produced with a high catalytic efficiency. In particular, when the process of this invention is applied to slurry polymerization or vapor-phase polymerization, there can be formed a granular or nearly spherical polymer having a high bulk density and a narrow particle size distribution, which looks as if it consisted of flocculated fine particles. Such a granular or spherical polymer has good flowability and in some application, can be used without pelletization.

The following Examples illustrate the present invention in more detail.

EXAMPLES 1 TO 5

Preparation of the catalyst component

Anhydrous magnesium chloride (4.76 g; 50 mmoles), 25 ml of decane and 23.2 ml (150 mmoles) of 2-ethylhexyl alcohol were heated at 130° C. for 2 hours to form a uniform solution. Each of the electron donor compounds (iii) shown in Table 1 was added in the amount indicated and the mixture was stirred under heat to form a uniform solution of magnesium containing the electron donor (iii). The solution was then added dropwise over about 1 hour to 200 ml of TiCl$_4$ kept at −20° C. with stirring. Then, the temperature was raised to 90° C. over the course of about 2 hours, and the reaction was carried out at this temperature for 2 hours. After the reaction, the solid material in the reaction mixture was collected by hot filtration, and fully washed with hot decane and hexane at room temperature until no free titanium compound was detected in the washings. Thus, a solid catalyst component [A] was obtained. Its composition is shown in Table 1.

Polymerization

A 2-liter autoclave was charged with 1000 ml of purified hexane, and under nitrogen atmosphere at room temperature, 1.0 mmole of triethyl aluminum and 0.02 mmole, calculated as titanium atom, of the catalyst component [A] were fed. The autoclave was then sealed up and heated to 70° C. During temperature elevation, hydrogen was introduced at 60° C. until the internal pressure of the autoclave reached 4.0 kg/cm².G. Ethylene was further introduced, and the total pressure of the autoclave was adjusted to 8.0 kg/cm².G. After the lapse of 2 hours from the introduction of ethylene, the autoclave was cooled, and the pressure was then released. After the polymerization, the slurry containing the resulting polymer was filtered to collect a powdery white polymer and dried. The results of the polymerization are shown in Table 2.

EXAMPLES 6 TO 9

Preparation of catalyst component [A]

Anhydrous magnesium chloride (4.76 g; 50 mmoles), 25 ml of decane and 23.2 ml (150 mmoles) of 2-ethylhexyl alcohol were heated at 130° C. for 2 hours to form a uniform solution. Then, each of the electron donor compounds (iii) shown in Table 1 was added, and mixed with stirring under heat to prepare a uniform solution of magnesium containing the electron donor (iii). Then, the uniform solution was added dropwise over the course of about 1 hour to 200 ml of TiCl$_4$ kept at −20° C. with stirring. The temperature was raised to 130° C. over the course of about 3 hours, and the reaction was carried out at this temperature for 2 hours. After the reaction, the solid material in the reaction mixture was collected by hot filtration. It was again suspended in 200 ml of TiCl$_4$, and reacted at 130° C. for 2 hours. The solid material was collected by hot filtration, and washed fully with hot decane and hexane at room temperature until no free titanium compound was detected in the washings. Thus, a solid catalyst component [A] was obtained. The composition of this component [A] is shown in Table 1.

Polymerization

A 2-liter autoclave was charged with 1000 ml of purified hexane, and under nitrogen atomosphere at room temperature, 1.0 mmole of triethyl aluminum (in Example 6, triisobutyl aluminum was used) and 0.02 mmole, calculated as titanium atom, of the catalyst component [A] were fed. The autoclave was sealed up, and then heated to 70° C. During the temperature elevation, hydrogen was introduced at 60° C. until the internal pressure of the autoclave reached 4.0 kg/cm$^2$.G. Further, ethylene was introduced, and the total pressure of the autoclave was adjusted to 8.0 kg/cm$^2$.G. During the polymerization, the autoclave was maintained for 2 hours at a temperature of 70° C. and a pressure of 8.0 kg/cm$^2$.G. After the lapse of 2 hours from the introduction of ethylene, the autoclave was cooled and then the pressure was released. After the polymerization, the slurry containing the resulting polymer was filtered, and a white powdery polymer was collected and then dried. The results of the polymerization are shown in Table 2.

1 hour to 200 ml of titanium tetrachloride kept at −20° C. with stirring. Thereafter, the same procedure as in Example 1 was repeated to synthesize a catalyst component [A]. Using the catalyst component [A], ethylene was polymerized in the same way as in Example 1.

The results of the polymerization are shown in Table 3.

EXAMPLE 11

Metallic magnesium (1.2 g), 5.0 ml of methanol and 23.3 ml of 2-ethylhexanol and then 0.75 ml of acetic acid and 50 ml of decane were reacted at 65° C. for 4 hours in the presence of hydrogen chloride to form a decane solution containing magnesium. Using the resulting decane solution, a catalyst component [A] was prepared in the same way as in Example 1, and ethylene was polymerized in the same way as in Example 1.

The results of the polymerization are shown in Table 3.

EXAMPLE 12

A solid substance (formed by the reaction of 50 mmoles of butyl magnesium chloride with silicon tetrachloride), 25 ml of decane and 23.4 ml of 2-ethylhexyl alcohol were reacted at 120° C. for 2 hours to obtain a decane solution containing magnesium. Acetic acid (0.75 ml) was added to the decane solution, and mixed with stirring.

Subsequently, by the same procedure as in Example 1, a catalyst component [A] was prepared, and ethylene was polymerized in the same way as in Example 1.

The results of the polymerization are shown in Table 3.

EXAMPLE 13

Diethoxy magnesium (5.7 g), 23.4 ml of 2-ethylhexyl alcohol and 50 ml of decane were reacted at 130° C. for 3 hours in the presence of hydrogen chloride to form a decane solution containing magnesium. Acetic acid (0.75 ml) was added to the decane solution, and mixed with stirring.

Subsequently, by the same procedure as in Example

TABLE 1

| Example | Electron donor (iii) Compound | (iii)/Mg Mole ratio | Catalyst composition (%) | | |
|---|---|---|---|---|---|
| | | | Ti | Cl | Mg |
| 1 | Acetic acid | 0.20 | 4.4 | 65 | 24 |
| 2 | Propionic acic | 0.25 | 5.2 | 64 | 17 |
| 3 | Ethylene glycol dibutyl ether | 0.20 | 4.1 | 60 | 18 |
| 4 | Ethylene glycol diethyl ether | 0.20 | 4.1 | 63 | 18 |
| 5 | Triisopropoxy aluminum | 0.20 | 4.5 | 64 | 18 |
| 6 | Acetic acic | 0.25 | 3.6 | 69 | 21 |
| 7 | Propionic acid | 0.25 | 4.0 | 63 | 18 |
| 8 | Triethoxy aluminum | 0.20 | 5.7 | 64 | 17 |
| 9 | Phenyl Cellosolve | 0.20 | 4.1 | 63 | 19 |

TABLE 2

| Example | Organo-metallic compound [B] | Activity | | MI (190° C./10 min.) | BD (g/ml) | Particle size distribution (wt. %)* | | | | | |
|---|---|---|---|---|---|---|---|---|---|---|---|
| | | g-PE/ mmole-Ti | kg-PE/g-solid catalyst [A] | | | ~20 | 20~32 | 32~60 | 60~150 | 150~350 | 350~ |
| 1 | Triethyl aluminum | 19700 | 18.1 | 3.6 | 0.40 | 0 | 7 | 78 | 15 | 0 | 0 |
| 2 | Triethyl aluminum | 21600 | 23.4 | 2.5 | 0.36 | 0 | 5 | 73 | 22 | 0 | 0 |
| 3 | Triethyl aluminum | 10500 | 8.9 | 2.4 | 0.37 | 0 | 0 | 66 | 33 | 1 | 0 |
| 4 | Triethyl aluminum | 18400 | 15.7 | 4.3 | 0.37 | 0 | 1 | 50 | 48 | 1 | 0 |
| 5 | Triethyl aluminum | 17200 | 16.2 | 1.9 | 0.35 | 0 | 0 | 22 | 77 | 1 | 0 |
| 6 | TIBA | 19000 | 14.3 | 0.6 | 0.39 | 0 | 8 | 68 | 24 | 0 | 0 |
| 7 | TIBA | 22000 | 18.4 | 1.0 | 0.32 | 0 | 1 | 12 | 85 | 2 | 0 |
| 8 | TIBA | 15600 | 18.6 | 0.2 | 0.35 | 0 | 1 | 28 | 69 | 2 | 0 |
| 9 | TIBA | 17300 | 14.8 | 0.9 | 0.34 | 0 | 1 | 34 | 63 | 2 | 0 |

*Determined by a sieving method. The particle site distribution numbers show the meshes of sieves.

EXAMPLE 10

Acetic acid (0.75 ml) was added to a uniform solution obtained by reacting 83.6 ml of a decane solution containing 50 mmoles of ethyl butyl magnesium with 15.4 ml of 2-ethylhexanol at 80° C. for 2 hours. The mixture was fully stirred, and added dropwise over the course of 1, a catalyst component [A] was prepared, and ethylene was polymerized in the same way as in Example 1.

The results of the polymerization are shown in Table 3.

EXAMPLE 14

Anhydrous magnesium chloride (4.76 g; 50 mmoles), 25 ml of decane and 26.2 ml of ethylene glycol dibutyl ether were reacted at 130° C. for 2 hours to form a decane solution containing magnesium. Acetic acid (0.75 ml) was added to the decane solution and mixed with stirring.

Subsequently, by the same procedure as in Example 1, a catalyst component [A] was prepared, and ethylene was polymerized in the same way as in Example 1.

The results of the polymerization are shown in Table 3.

EXAMPLE 15

Anhydrous magnesium chloride (4.76 g; 50 mmoles), 25 ml of decane and 23.2 ml (150 mmoles) of 2-ethylhexyl alcohol were reacted at 130° C. for 2 hours to form a uniform solution. Acetic acid (0.6 g; 10 mmoles) was added, and the mixture was stirred under heating to prepare a uniform solution of magnesium containing the electron donor (iii). To this solution was added 1.1 ml (10 mmoles) of titanium chloride, and mixed with stirring (at this time, no precipitation of particles occurred, and the mixture was a uniform solution). By using the resulting solution, a solid catalyst component [A] was prepared by the same procedure as in Example 1. Ethylene was then polymerized by using the solid catalyst component [A] in the same way as in Example 1.

The results of the polymerization are shown in Table 3.

EXAMPLE 16

A Ti-containing solid catalyst component [A] was prepared in the same way as in Example 15 except that instead of titanium tetrachloride, 6.1 ml (10 mmoles) of tetra-2-ethylhexoxy-titanium was used. Using the solid catalyst component [A], ethylene was polymerized.

The results of the polymerization are shown in Table 3.

COMPARATIVE EXAMPLE 1

Preparation of catalyst component [A]

Anhydrous magnesium chloride (4.76 g; 50 mmoles), 25 ml of decane and 23.2 ml (150 mmoles) of 2-ethylhexyl alcohol were reacted at 130° C. for 2 hours to prepare a uniform solution of magnesium. The uniform solution was added dropwise over the course of about 1 hour to 200 ml of TiCl$_4$ kept at −20° C. with stirring. The temperature was elevated to 90° C. over the course of about 2 hours, and the reaction was carried out at this temperature for 2 hours. After the reaction, the reaction mixture was filtered in an attempt to remove the solid material. But the solid material blocked up the meshes of the filter (G-3 filter), and its separation by filtration was extremely difficult. On the other hand, solid-liquid separation was attempted by decantation, but the speed of sedimentation of the solid portion was very slow. The solid substance obtained by filtering the reaction mixture for about 5 hours was washed with hot decane and hexane at room temperature by the same procedure as in Example 1 to form a solid catalyst component [A]. Examination by an optical microscope showed that the solid material had a particle diameter of less than about 1 microns.

Polymerization

Using the solid catalyst component [A] obtained above, ethylene was polymerized by the same procedure as in Example 1. The results of the polymerization are shown in Table 3.

TABLE 3

| Example | Catalyst composition (wt. %) | | | Activity | | MI (190° C./10 min.) | BD (g/ml) | Particle size distribution (wt. %) | | | | | |
|---|---|---|---|---|---|---|---|---|---|---|---|---|---|
| | Ti | Cl | Mg | g-PE/ mmole-Ti | kg-PE/g-solid catalyst [A] | | | ~20 | 20~32 | 32~60 | 60~150 | 150~350 | 350~ |
| 10 | 4.1 | 64 | 23 | 20300 | 17.4 | 1.9 | 0.39 | 1 | 2 | 69 | 28 | 0 | 0 |
| 11 | 3.8 | 60 | 19 | 16700 | 13.2 | 3.3 | 0.36 | 0 | 1 | 49 | 50 | 0 | 0 |
| 12 | 4.0 | 60 | 18 | 18300 | 13.9 | 2.9 | 0.38 | 0 | 7 | 76 | 17 | 0 | 0 |
| 13 | 4.0 | 61 | 19 | 16200 | 13.5 | 2.9 | 0.37 | 0 | 0 | 70 | 29 | 1 | 0 |
| 14 | 4.7 | 64 | 18 | 10300 | 10.1 | 6.1 | 0.33 | 0 | 1 | 50 | 48 | 1 | 0 |
| 15 | 5.6 | 53 | 15 | 11300 | 13.2 | 36 | 0.38 | 0 | 5 | 79 | 16 | 0 | 0 |
| 16 | 5.0 | 55 | 16 | 13200 | 13.8 | 4.1 | 0.38 | 0 | 3 | 80 | 17 | 0 | 0 |
| Comparative Example 1 | 13.0 | 63 | 8 | 5300 | 14.4 | 2.3 | 0.13 | 2 | 5 | 18 | 36 | 29 | 10 |

What is claimed is:

1. A solid titanium catalyst component containing magnesium, titanium and halogen as essential ingredients for use in the polymerization of ethylene or copolymerization of ethylene with not more than 10 mole% of an alpha-olefin having 3 to 10 carbon atoms and/or a diene, said catalyst component consisting essentially of the reaction product which is obtained by contacting a magnesium compound (i) in the liquid state having no reducing ability with (ii) a titanium compound in the liquid state to form a solid product, or first preparing a liquid mixture of the magnesium compound (i) and the titanium compound (ii) and then forming a solid product therefrom, said reaction of forming the solid product being carried out in the presence of at least one electron donor (iii) consisting of aryloxy group-containing alcohols, said solid product not coming into contact whether during or after its formation, with esters of polycarboxylic acids or esters of polyhydroxy compounds, said catalyst component having a magnesium/titanium atomic ratio of from about 2 to about 100, a halogen/titanium atomic ratio of from about 4 to about 100, and an electron donor/titanium molar ratio of from about 0.01 to about 100.

2. In a process for producing olefin polymers or copolymers which comprises polymerizing ethylene or copolymerizing ethylene with not more than 10 mole% of an alpha-olefin having 3 to 10 carbon atoms and/or a diene in the presence of [A] a solid titanium catalyst component containing magnesium, titanium and halogen as essential ingredients and [B] an organoaluminum compound at a temperature of about 20° to about 200°

C. and a pressure from atmospheric pressure to about 100 kg/cm²; the improvement wherein said catalyst component [A] consists essentially of the reaction product which is obtained by contacting a magnesium compound (i) in the liquid state having no reducing ability with a titanium compound (ii) in the liquid state to form a solid product or first preparing a liquid mixture of the magnesium compound (i) and the titanium compound (ii) then forming a solid product therefrom, said reaction of forming the solid product being carried out in the presence of at least one electron donor (iii) consisting of aryloxy group-containing alcohols said solid product not being contacted, during or after its formation, with an ester selected from the group consisting of esters of polycarboxylic acids and esters of polyhydroxy compounds, said catalyst component [A] so obtained having magnesium/titanium atomic ratio of from about 2 to about 100, halogen/titanium atomic ratio of from about 4 to about 100, and electron donor/titanium molar ratio of from about 0.01 to about 100.

3. The process of claim 2 wherein the catalyst component [A] is obtained by contacting (i) the magnesium compound in the liquid state with (ii) the titanium compound in the liquid state to form the solid product and wherein the magnesium compound (i) in the liquid state is a solution in a liquid hydrocarbon or halogenated hydrocarbon.

4. The process of claim 2 wherein the catalyst component [A] is obtained by first preparing the liquid mixture of the magnesium compound (i) and the titanium compound (ii) and then forming the solid product therefrom and wherein the liquid mixture of the magnesium compound (i) and the titanium compound (ii) is a solution in a liquid hydrocarbon or halogenated hydrocarbon.

5. The process of claim 2 wherein the titanium compound (ii) is a tetravalent titanium compound of the formula $$Ti(OR)_g X_{4-g}$$

wherein R represents a hydrocarbon group, X represents a halogen atom and g is a number represented by $0 \leq g \leq 4$.

6. The process of claim 2 wherein the electron donor (iii) is a $C_6$–$C_{12}$ aryloxy group-containing alcohol.

7. The process of claim 2 wherein the polymerization is carried out under such quantitative conditions that per liter of the liquid reaction medium in the case of liquid-phase reaction, or per liter of the volume of the reaction zone in the case of vapor-phase reaction, component [A] is used in an amount of 0.0001 to 1 millimole calculated as the titanium compound; component [B], in an amount of 1 to 2,000 moles as the metal atom therein per mole of the titanium atom in component [A].

8. The process of claim 2 wherein the electron donor (iii) is ethylene glycol monophenyl ether or propylene glycol monophenyl ether.

9. The process of claim 2 wherein the magnesium/titanium atomic ratio is from about 4 to about 50, the halogen/titanium atomic ratio is from about 5 to about 90, and the catalyst component [A] has a specific surface area of from about 100 to 1000 m²/g, a particle diameter in the range of from about 1 to about 100 microns with a narrow particle size distribution and is composed of granular or spherical particles.

10. The process of claim 2 for polymerizing ethylene wherein the magnesium compound (i) is magnesium chloride, the titanium compound (ii) is titanium tetrachloride, the electron donor (iii) is phenyl cellosolve, and the organoaluminum compound is triethyl aluminum or triisobutyl aluminum.

* * * * *